United States Patent [19]
Atkinson

[11] Patent Number: 5,710,928
[45] Date of Patent: *Jan. 20, 1998

[54] METHOD AND SYSTEM FOR CONNECTING OBJECTS IN A COMPUTER SYSTEM

[75] Inventor: Robert G. Atkinson, Woodinville, Wash.

[73] Assignee: Microsoft Corporation, Redmond, Wash.

[*] Notice: The term of this patent shall not extend beyond the expiration date of Pat. No. 5,499,369.

[21] Appl. No.: 571,359

[22] Filed: Dec. 13, 1995

Related U.S. Application Data

[63] Continuation of Ser. No. 316,058, Sep. 30, 1994, Pat. No. 5,499,369, which is a continuation of Ser. No. 974,959, Nov. 9, 1992, abandoned.

[51] Int. Cl.⁶ ........................................ G06F 9/06
[52] U.S. Cl. .......................................... 395/710
[58] Field of Search .............................. 395/683, 703, 395/710

[56] References Cited

U.S. PATENT DOCUMENTS

| | | | |
|---|---|---|---|
| 4,739,477 | 4/1988 | Barker et al. | 364/300 |
| 4,933,880 | 6/1990 | Borgendale et al. | 364/523 |
| 5,072,412 | 12/1991 | Henderson, Jr. et al. | 395/159 |
| 5,175,848 | 12/1992 | Dysart et al. | 395/600 |
| 5,303,379 | 4/1994 | Khoyi et al. | 395/700 |
| 5,341,478 | 8/1994 | Travis, Jr. et al. | 395/200 |

FOREIGN PATENT DOCUMENTS 0 374 512 A2  11/1989  European Pat. Off. ........ G06F 15/40

OTHER PUBLICATIONS

"Named Pipes Makes Operating System/2 Extended Edition Multi-User," *IBM Technical Disclosure Bulletin*, vol. 34, No. 4B, Sep. 1991., pp. 387–388.

M. Pflügl and A. Damm, "Kommunikationsmechanismen verteilter Systeme und ihre Echtzeitfähigkeit," *Informatik Spektrum*, vol. 12, No. 3, pp. 121–132.

Microsoft Corporation, "Object Linking and Embedding," Nov. 1991.

*Primary Examiner*—Thomas M. Heckler
*Attorney, Agent, or Firm*—Seed and Berry LLP

[57] ABSTRACT

Method and system for connecting link object to a link source. In a preferred embodiment, a source process registers the link source in a running object table when the link source enters a running state. When a consumer process subsequently puts a container object containing the link object in a running state, the consumer process determines if the link source is registered in the running object table. If the link source is registered in the running object table, then a connection is established between the link object and the link source. If, however, the link source is not registered, then the consumer process registers the link object in an alert object table. When a source process subsequently puts the link source in the running state, the source process determines if the link object is registered in the alert object table. If the link object is registered in the alert object table, then the source process notifies the link object and a connection is established between the link object and the link source.

8 Claims, 12 Drawing Sheets

ALERT OBJECT TABLE

RUNNING OBJECT TABLE

METHOD AND SYSTEM FOR CONNECTING OBJECTS IN A COMPUTER SYSTEM

CROSS-REFERENCE TO RELATED APPLICATION

This application is a continuation of U.S. patent application Ser. No. 08/316,058, filed Sep. 30, 1994, now U.S. Pat. No. 5,499,369, which is a file wrapper continuation of U.S. patent application Ser. No. 07/974,959 filed Nov. 9, 1992, now abandoned.

TECHNICAL FIELD

This invention relates generally to a computer method and system for updating objects with new information, and more specifically, to a method and system for connecting a link object to its link source without explicitly activating the link object.

BACKGROUND OF THE INVENTION

Current document processing computer systems allow a user to prepare compound documents. A compound document is a document that contains information in various formats. For example, a compound document may contain data in text format, chart format and/or numerical format. FIG. 1A is an example display showing a compound document. The compound document 101 contains text data 102 and 103 and spreadsheet data 104.

FIG. 1B is a block diagram showing a file layout of the compound document shown in FIG. 1A. The file "compound.doc" 111 contains data blocks 112 and 113 containing the text data and data block 114 for storing the spreadsheet data. The data block 114 contains the spreadsheet data in a presentation format 116 and a link 115 to a file 117 that contains the spreadsheet data. A presentation format is a format in which data is easily displayed on an output device. For example, the presentation format may be a bitmap that can be displayed with a standard block transfer operation such as a BitBlt. The file 111 contains the spreadsheet data in presentation format so that the file 117 does not need to be accessed every time the compound document is displayed. The link 115 points to the file 117 where the spreadsheet data is stored in a native format. A native format is a format that is recognizable by the program that created the file.

FIG. 2 shows a method for creating a compound document. A user generates the spreadsheet data 206 using spreadsheet process 205. The spreadsheet process 205, typically under user control, then stores the spreadsheet data 206 in a presentation format (presentation data) and a link (pointer) to the native spreadsheet data in a clipboard 207. The clipboard 207 is an area of storage (disk or memory) that is typically accessible by any process.

Next, the user launches a word processing process 204 to create the compound document 201. The user enters text data 202 and specifies a location in the compound document 201 at which to insert the data in clipboard 207. The word processing process 204 then copies and stores the presentation data and link from the clipboard 207 and displays the spreadsheet data using the copied presentation data in the compound document 201 at the specified location. This insertion process is referred to as "paste linking" from the clipboard. Data that is paste linked into a compound document is referred to as linked data.

A process which stores data in a clipboard is called a source process. A process which copies data from the clipboard is called a consumer process. In the present example, the spreadsheet process 205, which stores data in clipboard 207, is a source process, and word processing process 204 is a consumer process. Typically, a single process acts as both a consumer and source process at different times.

In object-oriented parlance, any collection of data or functions is referred to as an object. Thus, compound document 201, spreadsheet data 206, spreadsheet data 203, and text data 202 are objects. Also, an object that is contained within another object is referred to as a contained object within a container object. Spreadsheet data 203 is a contained object within compound document 201, which is a container object. An object that contains a link to native data is a link object. An object that a link object points to is a link source. In FIG. 2, spreadsheet data 203 is a link object and spreadsheet data 206 is a link source.

Prior systems typically allow a user to establish a connection between a link object and its link source so that modifications to the link source can be reflected when the container object of the link object is displayed. To establish a connection, the user instructs the consumer process to activate the link object. The consumer process activates the link object by starting the source process and establishing a connection with the source process using standard operating system interprocess communication mechanisms in response to user selection. Through this connection, the source process notifies the consumer process when the link source has been modified. The consumer process can then modify its presentation data to reflect the modifications in the link source. Thus, when a connection is established between the link object and its link source, the presentation data in the link object accurately reflects modifications of the link source data.

In certain situations, prior systems allow link source data to be modified without modifying the consumer process presentation data. Thus, the link source data and presentation data can be inconsistent. A user can start the source process, open the link source, and display and modify the link source data. If the user then starts the consumer process, opens the compound document, and displays the presentation data, the displayed presentation data will be inconsistent with the displayed link source data. Since the source process was not started as a result of activating the link object, there is no connection through which consistency can be maintained. This inconsistency is undesirable.

SUMMARY OF THE INVENTION

It is an object of the present invention to provide a method and system for automatically connecting a link source to a link object.

It is another object of the present invention to provide a method and system wherein the connection is established when the link source does not enter a running state through activation of the link object.

These and other objects, which will be apparent as the invention is more fully described, are provided by a method and system for automatically connecting a link object to a link source. In a preferred embodiment, a source process registers the link source in a running object table when the link source enters a running state. When a consumer process subsequently puts a container object containing the link object in the running state, the consumer process determines if the link source is registered in the running object table. If the link source is registered in the running object table, then the consumer process can establish a connection between the link object and the link source. Alternatively, when a consumer process puts a container object of the link object in the running state and if the link source is not in the running object table, the consumer process puts the link object in an alert state and registers the link object in an alert object table. When a source process subsequently puts the link source in the running state, the source process determines if the link object is registered in the alert object table. If the link object is registered in the alert object table, then the source process notifies the link object. The link object can then establish a connection between the link object and the link source.

DETAILED DESCRIPTION OF THE INVENTION

The present invention provides a method and system for automatically connecting link objects to their link sources without explicitly activating the link objects. When a compound document is put in a running state by a consumer process, each link object contained in the compound document is put in an alert state and registered in an alert object table (AOT). If at a later time a link source is put in a running state by a source process, the link source is registered in a running object table (ROT) and the alert object table is scanned to determine whether any corresponding link objects are registered in the AOT awaiting notification of the running of the registered link source. If a corresponding link object is registered, then the source process notifies the link object. The link object then directs the consumer process to establish a connection between the link object and the link source, using standard interprocess communication techniques. If the source process modifies the link source data after the connection is established, then the modifications are reflected in the presentation data associated with the link object.

If, instead, the link source is put in the running state before a corresponding link object is put in an alert state, then the processes operate in a slightly different manner. Specifically, when the source process puts the link source in the running state, the link source is registered in the running object table (ROT). If at a later time a compound document that contains a link object is put in the running state by a consumer process, then the link object enters the alert state and the ROT is scanned by the consumer process to determine whether any corresponding link sources are registered in the ROT. If a corresponding link source is registered, then the consumer process establishes a connection between the link object and the link source, using standard interprocess communication techniques. If the source process modifies the link source data after the connection is established, then the modifications are reflected in the presentation data associated with the link object.

Figure 3:
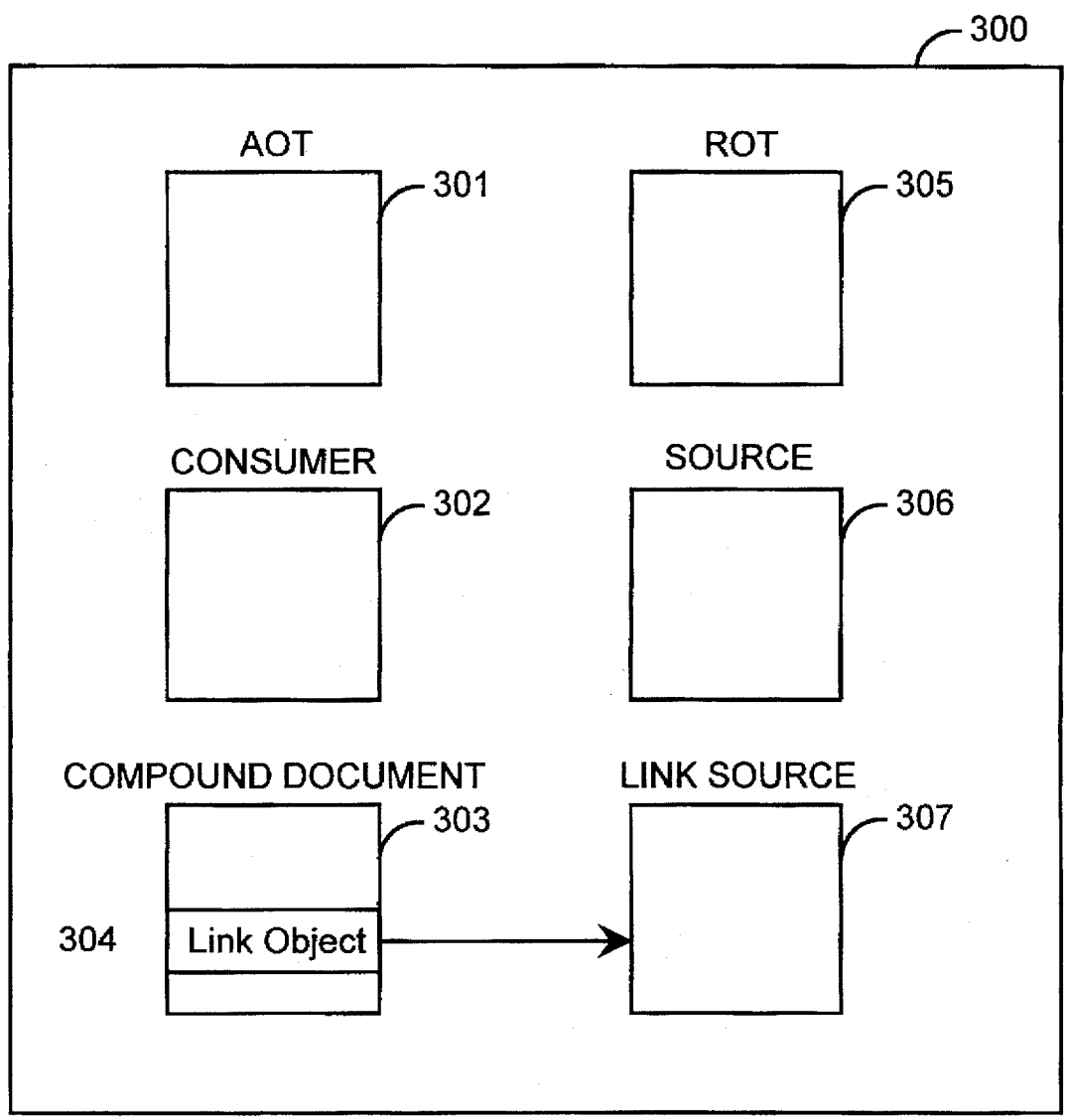
FIG. 3 is a diagram showing a preferred computer system.

FIG. 3 is a block diagram illustrating a computer system in which the present invention is preferably implemented. Computer system 300 comprises computer memory, a central processing unit, storage devices, and input/output devices. The input/output devices include a display, a keyboard, and a mouse. The alert object table 301, running object table 305, and computer instructions and data for the consumer process 302 and source process 306 are stored in the computer memory. The computer instructions are executed under the control of the central processing unit. The compound document 303, which contains link object 304 and the link source 307, is stored on a storage device, such as a disk. The consumer process 302 and source process 306 load portions of the compound document 303 and link source 307 into the computer memory for processing. Although preferred embodiment is described as being implemented on a standard computer system, one skilled in the art would recognize that the present invention could also be implemented on computer systems with other architectures. For example, the present invention can be implemented on a multiprocessor computer system or a computer system comprising multiple computers.

In a preferred embodiment, an object can be in the following states: passive, loaded, running, and alert. An object is in the passive state when it is stored only on disk. An object is in the loaded state when its object structure is loaded into the memory of a consumer process. An object is in the running state when the source process for the object is running and the object data is available to the source process. An object is in the alert state when it is awaiting notification that another object has entered the running state.

In the following, a pointer to an object represents the address of an object in the loaded state. The object can be accessed using this pointer. An identifier of an object represents a unique identification of the object regardless of its state. Thus, a link source identifier identifies an object that may be in the running state, passive state, etc. In a preferred embodiment, each object has an associated function that returns the pointer to the object. If the object is not already in the loaded state, the function puts the object in the loaded state and returns the pointer. A pointer and an identifier are referred to generically as references.

Figure 1A:
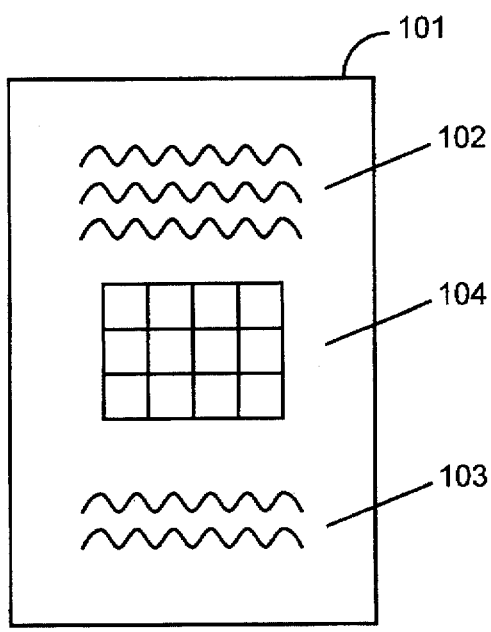
FIG. 1A is an example display showing a compound document.
Figure 1B:
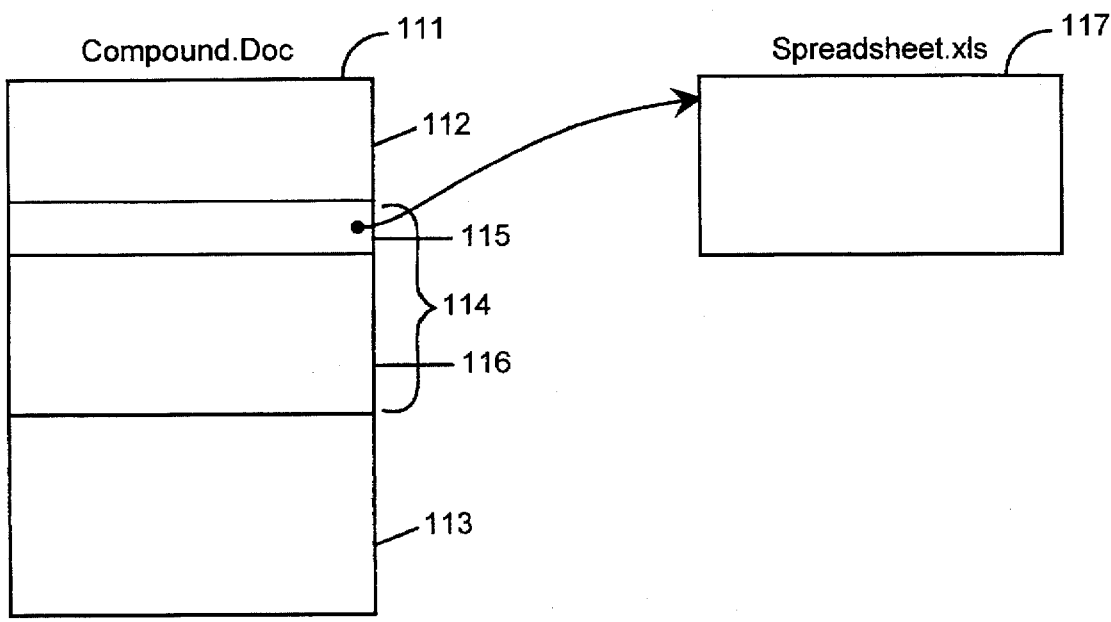
FIG. 1B is a block diagram showing a file layout of the compound document shown in FIG. 1A.
Figure 2:
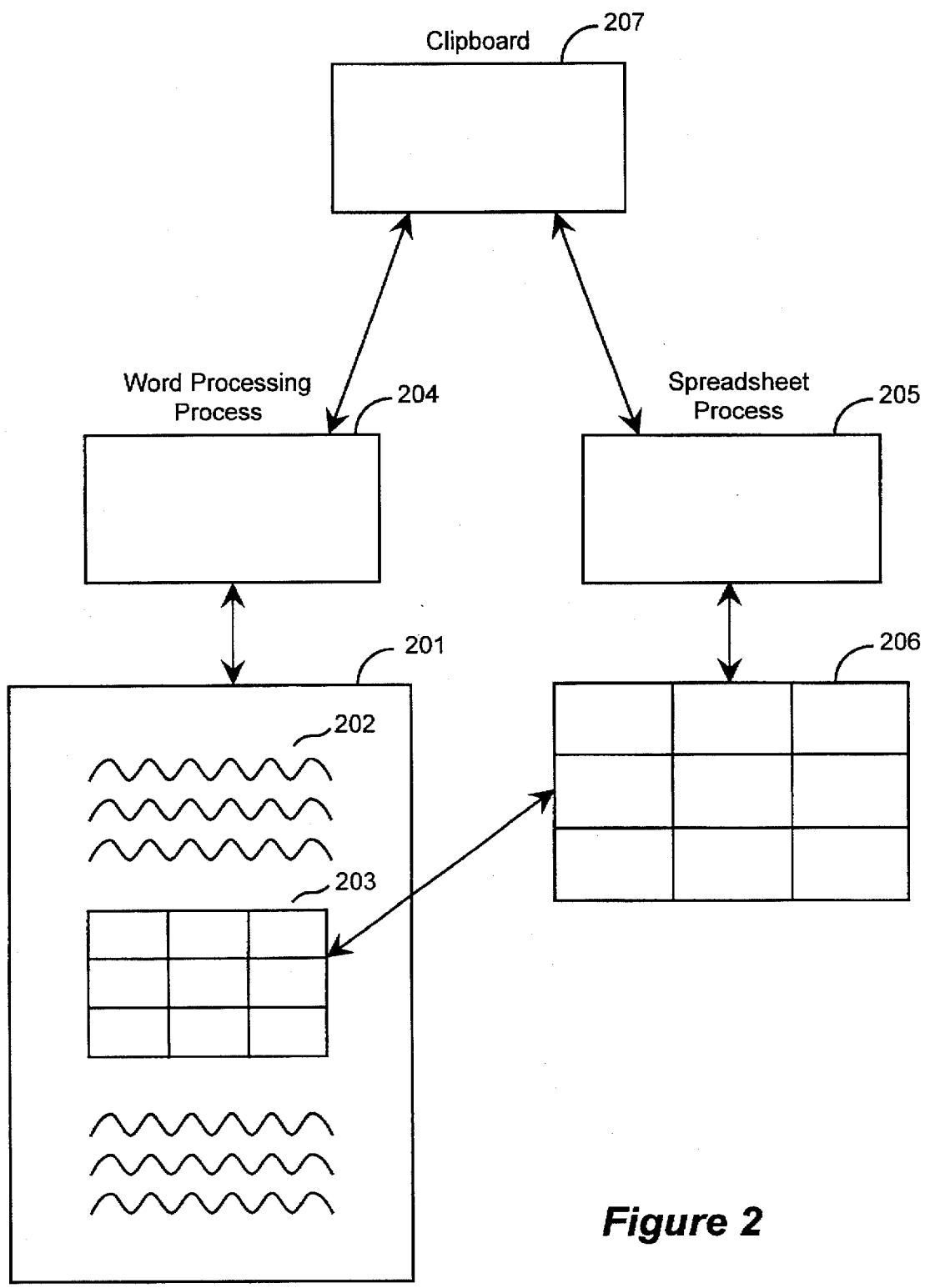
FIG. 2 is a block diagram illustrating a method for creating a compound document.
Figure 4:
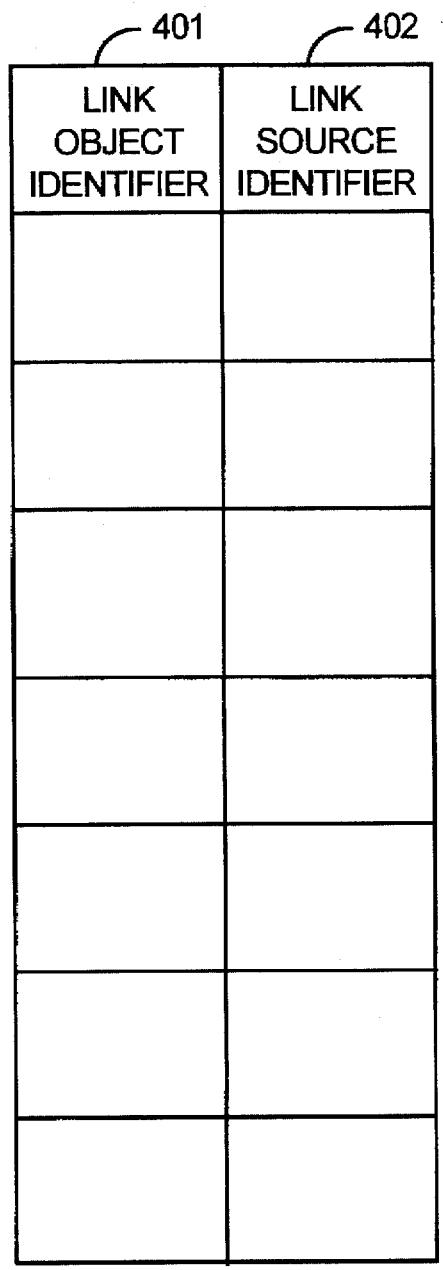
FIG. 4 is a block diagram of a preferred embodiment of an alert object table.

A preferred embodiment of the present invention uses two primary data structures: an alert object table (AOT) and a running object table (ROT). The alert object table is used to register link objects in the alert state, which are to be connected to link sources when the corresponding link sources enter the running state. FIG. 4 is a block diagram of a preferred embodiment of the alert object table. Each row of the alert object table corresponds to a link object in the alert state and contains two items of information: a link object identifier 401 and a link source identifier 402. The link object identifier 401 uniquely identifies a link object that is in the alert state. For example, the link object identifier for spreadsheet object 203 (FIG. 2) could be the string "PID\compound.doc\object1." The "PID" indicates the consumer process identification and "\compound.doc\object1" identifies the object within the compound document. Link source identifier 402 uniquely identifies the link source. For example, the link source identifier for spreadsheet object 206 could be string "c:\spreadsheet.xls," which identifies the location of the spreadsheet file. If, instead, the link source was a specific range within the spreadsheet, the link source identifier could be string "c:\spreadsheet.xls\range R1:C1-R3:C3," where the "range R1:C1-R3:C3" identifies an object within the spreadsheet file. Once information has been stored in the alert object table, a source process can scan the AOT to identify which link objects need to be notified. In an alternate embodiment, the alert object table stores a link object pointer rather than a link object identifier.

Figure 5:
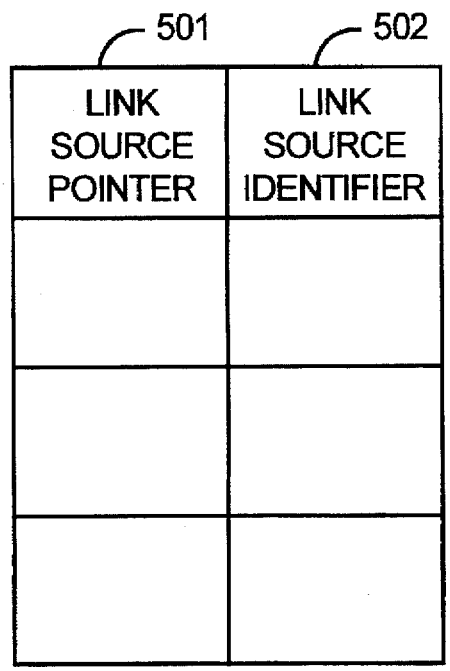
FIG. 5 is a block diagram of a preferred embodiment of a running object table.

The running object table is used to register link sources that are in the running state. FIG. 5 is a block diagram of a preferred embodiment of the running object table. Each row of the running object table corresponds to a source object in the running state and contains two items of information: a link source pointer 501 and a link source identifier 502. The link source pointer 501 points to an instance of the link source object in the running state. Link source identifier 502 uniquely identifies the link source as discussed above with reference to the alert object table.

Figure 6:
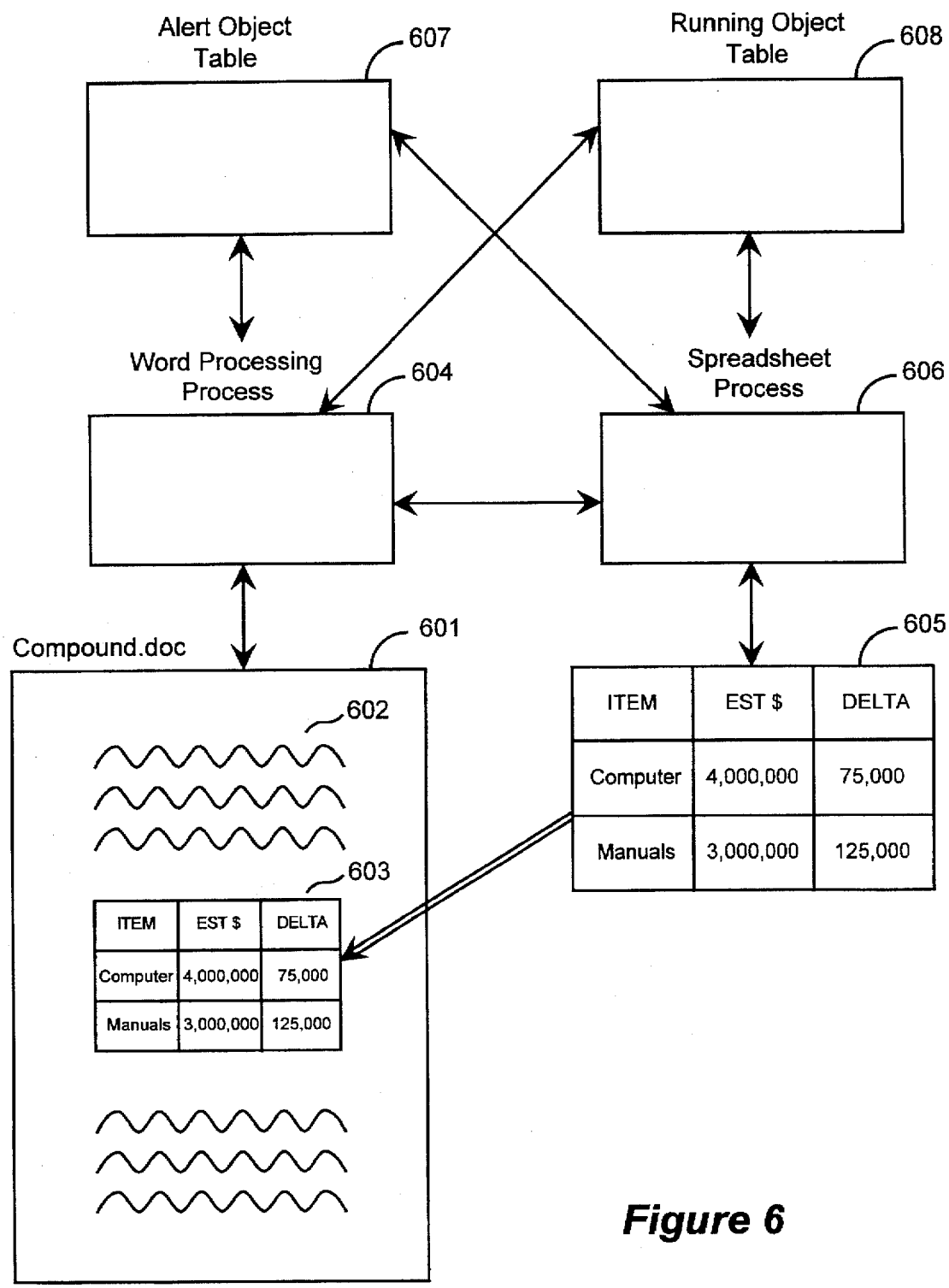
FIG. 6 is a block diagram illustrating automatically making a connection between a link object and a source object.

Two examples using FIG. 6 will help illustrate operation of the present invention. The first example depicts the present invention when a link source is put in the running state after a corresponding link object is registered in the alert object table. The second example depicts the present invention when a link source is put in the running state before a corresponding link object is registered in the alert object table.

In the first example, a user starts word processing process 604 and opens compound document 601, which puts the compound document in the running state. The word processing process 604 determines that a contained spreadsheet object 603 is a link object and contains a link source identifier which identifies the spreadsheet object 605. The word processing process 604 retrieves the link source identifier and scans the running object table 608 to determine if spreadsheet object 605 is in the running state. Since the spreadsheet object 605 is not in the running state, there is no entry in the running object table 608 matching the retrieved link source identifier. Word processing process 604 then registers spreadsheet object 603 in the alert object table 607. This registration process stores in the alert object table the link object identifier of the spreadsheet object 603 and the link source identifier of the spreadsheet object 605.

When the user starts the spreadsheet process 606 and puts spreadsheet object 605 in the running state, the spreadsheet process 606 registers spreadsheet object 605 in the running object table 608. This registration process stores the link source pointer and the link source identifier of the spreadsheet object 605.

Once spreadsheet object 605 is registered, spreadsheet process 606 scans the alert object table 607 to determine if any link objects are registered as awaiting notification that spreadsheet object 605 is in the running state. After determining that the spreadsheet object 603 is registered as awaiting notification from the spreadsheet object 605, the spreadsheet process 606 notifies the spreadsheet object 603. The spreadsheet object 603 then directs the word processing process 604 to establish a connection between link spreadsheet object 603 and source spreadsheet object 605 so that modifications made to spreadsheet object 605 are reflected in the presentation data of spreadsheet object 603.

In the second example, again using FIG. 6, a user opens a compound document containing link spreadsheet object 603 after the corresponding source spreadsheet object 605 has been registered in the running object table 608. Once again, compound document 601 has been created such that spreadsheet object 603 is a link object and contains a link source identifier to spreadsheet object 605.

Before opening the compound document, the user starts the spreadsheet program 606 and opens the spreadsheet object 605. When the user opens spreadsheet object 605, the object enters the running state and is registered in the running object table 608. The registration process stores the link source pointer of the spreadsheet process 606 and the link source identifier of the spreadsheet object 605.

Once spreadsheet object 605 has been registered, spreadsheet process 606 scans the alert object table 607 to determine if there are any objects registered in the alert object table 607 awaiting notification of the running of spreadsheet object 605. In the present example, spreadsheet process 606 finds that no objects are currently awaiting notification of the running of spreadsheet object 605.

Later, when the user starts up the word processing process 604 and opens the compound document 601 (which puts the compound document in the running state), and then opens spreadsheet object 603, the word processing process 604 determines that the spreadsheet object 603 is a link object corresponding to link source 605. The word processing process 604 then scans the running object table 608 and determines that spreadsheet object 605 is in the running state. Word processing process 604 then connects spreadsheet object 603 to spreadsheet object 605 so that modifications to spreadsheet object 605 are reflected in spreadsheet object 603.

In a preferred embodiment of the present invention, an optimization can be made to make the running object table smaller and more efficient. Specifically, in either example discussed relative to FIG. 6, the spreadsheet process 606 only registers spreadsheet object 605 in the running object table 608 when there is a possibility that a compound document may contain a link to the spreadsheet 605. Otherwise, if no possibility exists, there is no need for an entry in the running object table. To implement this optimization, the spreadsheet process 606 keeps track of any links requested from it. For example, the spreadsheet process 606 can record this information when it is requested to place data in presentation format on the clipboard with a link source identifier. The spreadsheet process 606 can then store this information in the link spreadsheet object 605. When the spreadsheet object 605 subsequently enters the running state, if the information indicates a link was requested at least once, then the spreadsheet object 605 is registered in the running object table.

Figure 7:
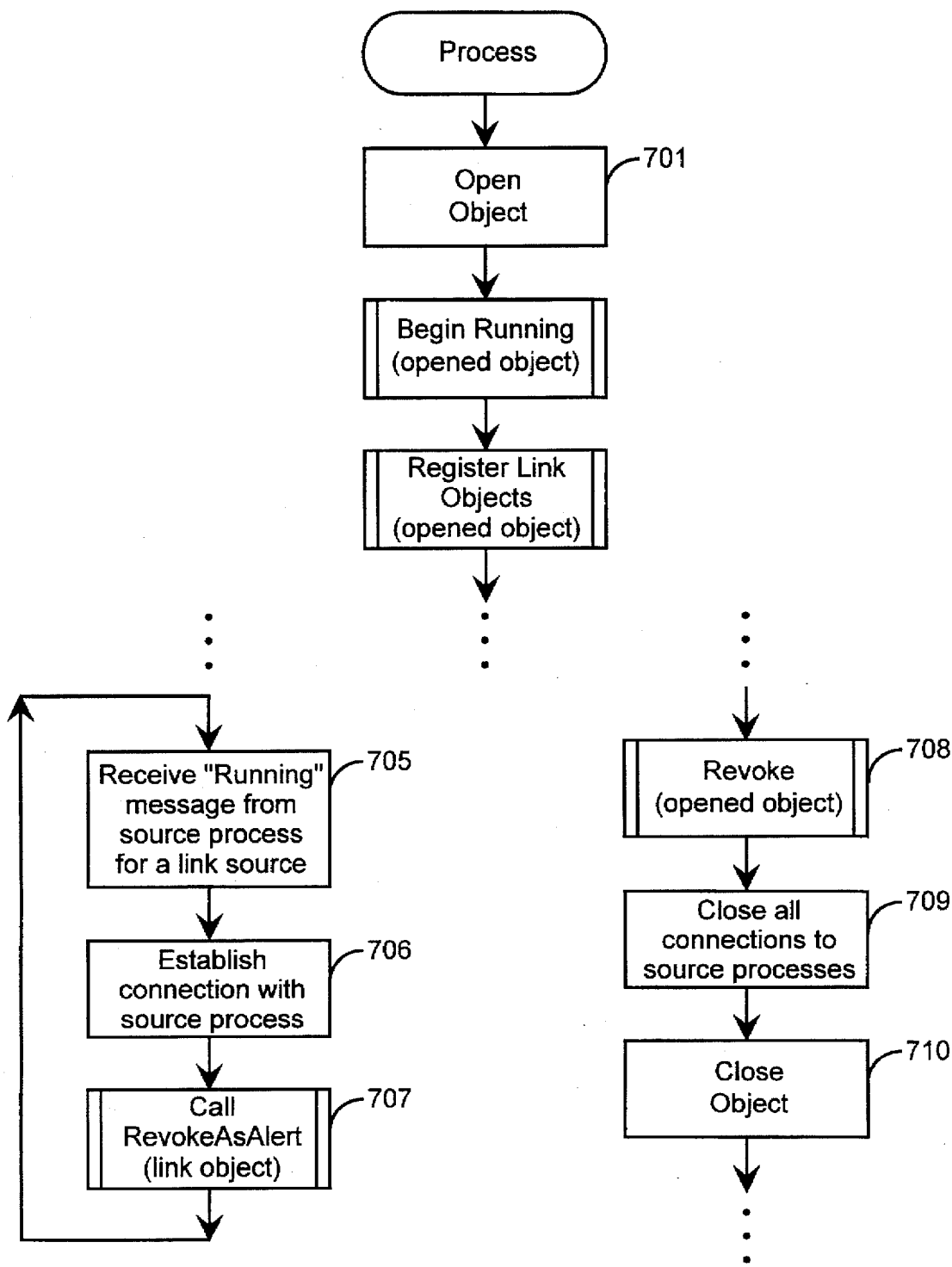
FIG. 7 is a flow diagram of a process acting as a consumer and source.

FIGS. 7 through 12 are flow diagrams illustrating the automatic connection techniques of the present invention. FIG. 7 is a flow diagram illustrating how a process registers objects as running or alert, establishes a connection, and revokes the registration of objects when the object leaves the alert or running states. A process acts as a consumer process when an object in the running state contains a link object and acts as a source process when an object in the running state is a link source. In a preferred embodiment, existing computer programs can be modified or new computer programs can be developed in accordance with the flow diagram. These computer programs can then function as consumer and source processes as described below. In steps 701, 702A, and 702B, the process opens an object, invokes a routine to register the object as running, and invokes a routine to register contained link objects as alert. In step 701, the process opens an object, which puts the object in the running state. In step 702A, the process invokes routine BeginRunning passing it the opened object to register the object in the running object table. The routine BeginRunning is invoked whenever an object enters the running state. In step 702B, the process invokes the routine RegisterLinkObjects passing it the opened object. The routine RegisterLinkObjects registers in the alert object table the link objects in the opened object when the corresponding source objects are not in the running state. The ellipses indicate that the process continues with its normal processing. Steps 705 through 707 represent a message loop for receiving notification that an object enters the running state. When a process receives such notification, the process processes the notification in steps 706 and 707. In steps 705 through 707, the process acting as a consumer process receives a message from a source process indicating that a link source is now in the running state, establishes a connection with the source process, and revokes the registration of the corresponding link object. In step 705, the process receives notification from a source process that puts the link source corresponding to a link object that is registered in the alert object table in the running state. In step 706, the process establishes a connection with the source process. In step 707, the function invokes function RevokeAsAlert passing it the link object. The function RevokeAsAlert removes the entry corresponding to the link object from the alert object table. Steps 708 through 710 are executed when an object, such as a compound document, is closed (exits the running state). In steps 708 through 710, the process revokes all registrations for the opened object, closes any connections to source processes, and closes the object, which puts the object in the passive state. In step 708, the process invokes function Revoke passing it the opened object. In step 709, the process closes all connections to source processes. In step 710, the source closes the opened object.

Figure 8:
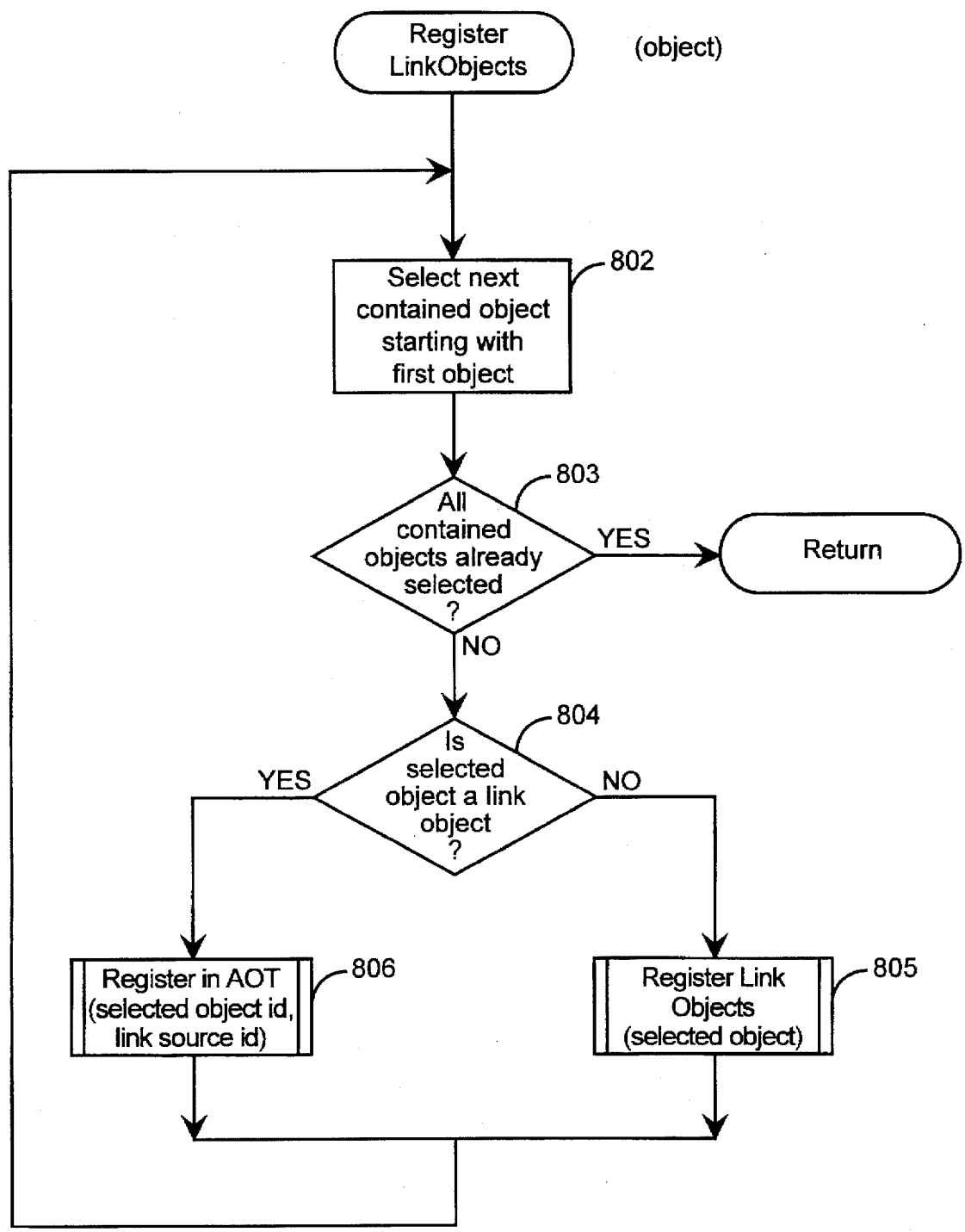
FIG. 8 is a flow diagram of the function Register.

FIG. 8 is a flow diagram of the function RegisterLinkObjects. This function is passed an object and registers all contained link objects in the alert object table. All link objects within any contained object to any level of nesting are also registered in the alert object table by recursively invoking this routine. In steps 802 through 806, the function loops registering each contained object by calling the function RegisterInAOT for link objects or by recursively calling the function RegisterLinkObject for non-link objects. In step 802, the function selects the next contained object, starting with the first contained object. In step 803, if all contained objects have already been selected, then the function returns, else the function continues at step 804. In step 804, if the selected object is a link object, then the function continues at step 806, else the function continues at step 805. In step 805, the function recursively invokes function RegisterLinkObjects passing it the selected object. The function then loops to step 802. In step 806, the function invokes the function RegisterInAOT to register the selected object in the alert object table. The function then loops to step 802.

Figure 9:
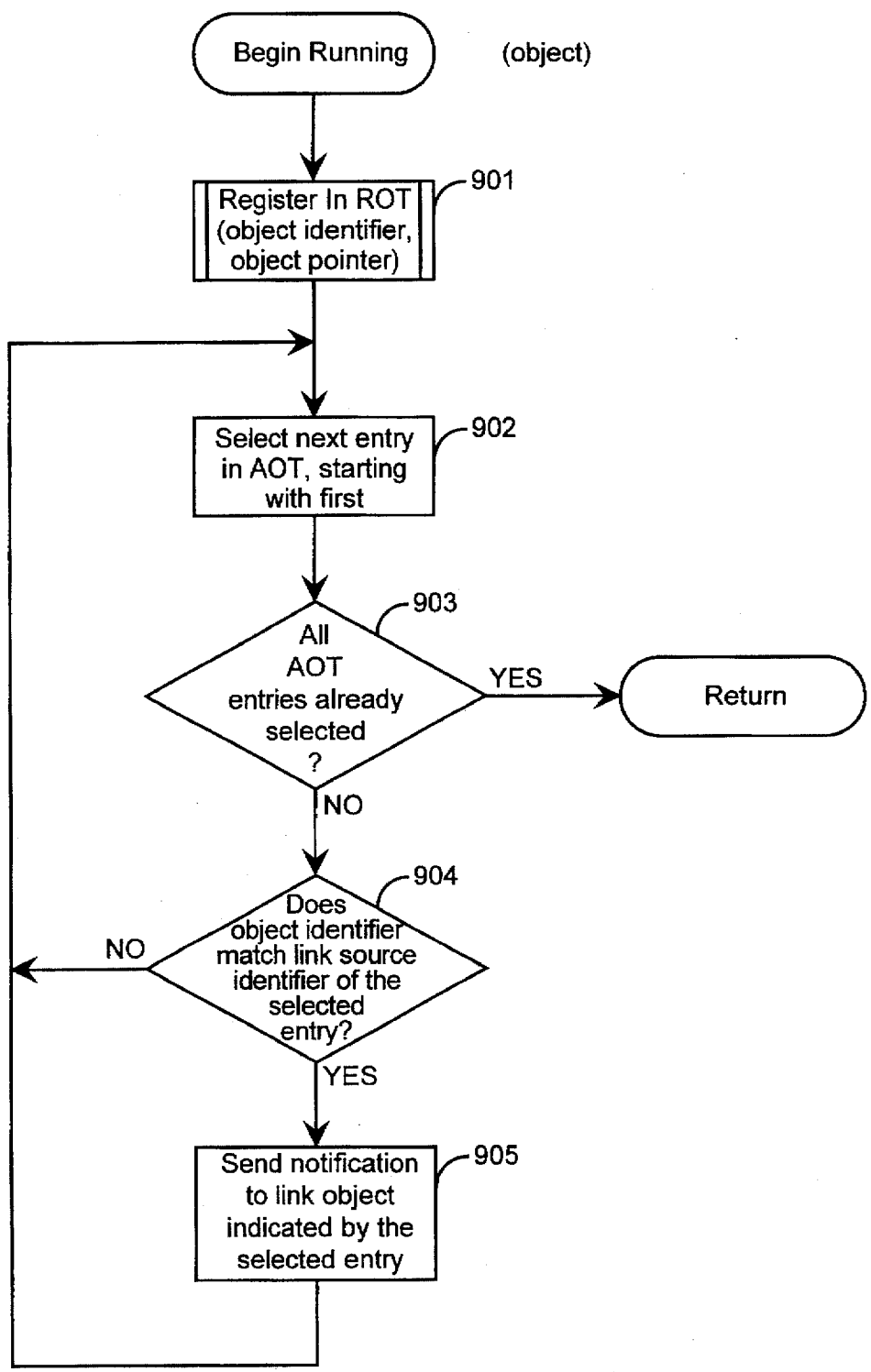
FIG. 9 is a flow diagram of the function BeginRunning.

FIG. 9 is a flow diagram of the function BeginRunning. The function BeginRunning is passed an object and registers the object identifier in the running object table. In step 901, the function invokes function RegisterInROT to add an entry into the running object table for the source object link source identifier. In steps 902 through 905, the function sends a message to each link object that is awaiting notice of the running of the link source identified by the object identifier. In step 902, the function selects the next entry in the alert object table starting with the first entry. In step 903, if all entries in the alert object table have already been selected, then the function returns, else the function continues at step 904. In step 904, if the object identifier matches the link source identifier in the selected entry, then the function, in step 905, sends notification to the link object identified by the link object identifier of the selected entry. The function then loops to step 902.

Figure 10:
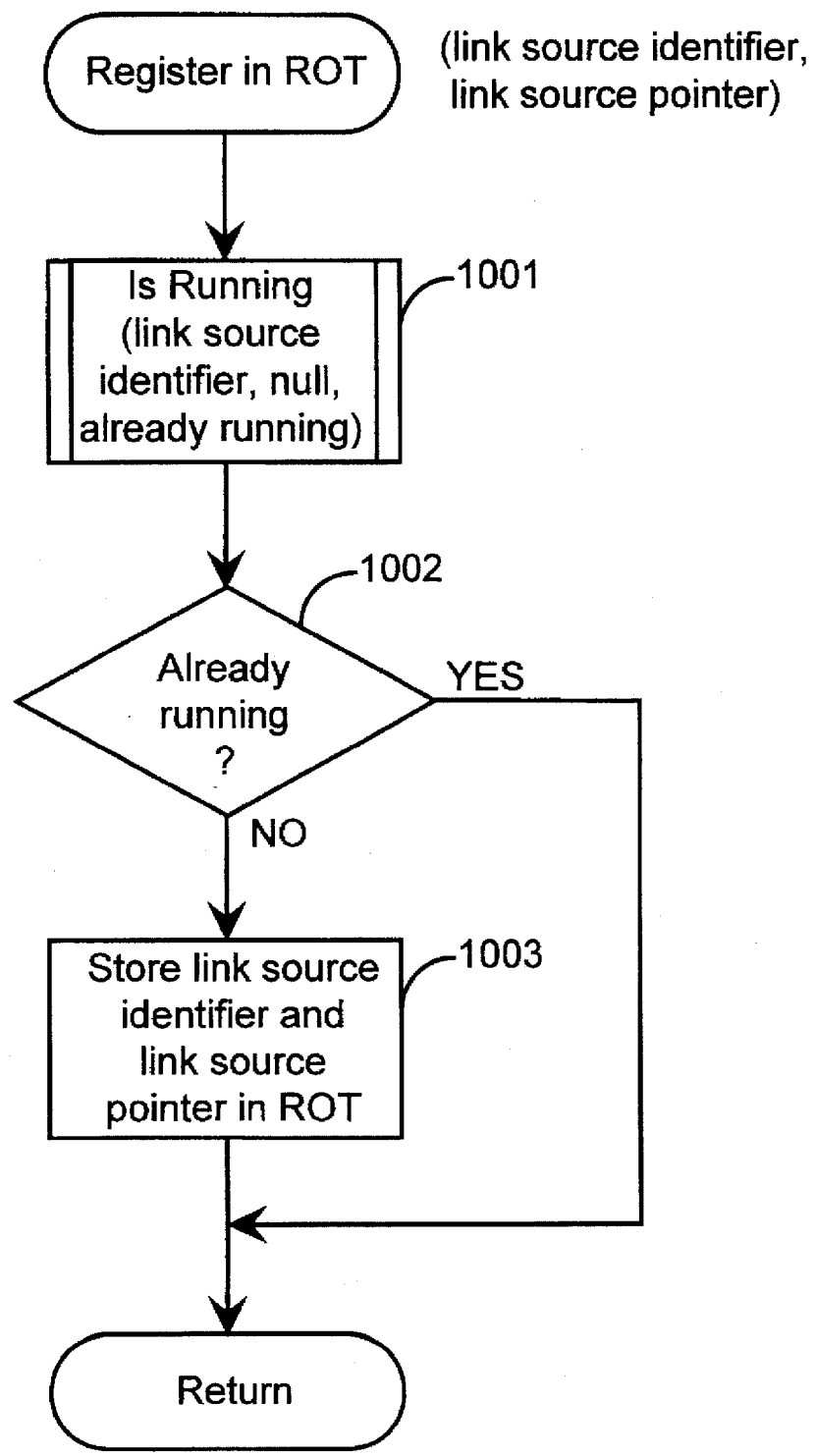
FIG. 10 is a flow diagram of the function RegisterInROT.

FIG. 10 is a flow diagram of the function RegisterInROT. The function RegisterInROT is passed a link source identifier and a link source pointer, determines if the link source identifier is already in the running object table, and if not, stores an entry for the link source identifier in the running object table. In step 1001, the function invokes function IsRunning to determine whether the link source identifier is already in the running object table. The function IsRunning searches the running object table and returns a flag indicating whether the object is already in the table. In step 1002, if the link source identifier is already in the running object table, then the function returns, else the function continues at step 1003. In step 1003, the function adds an entry for the link source identifier to the running object table.

Figure 11:
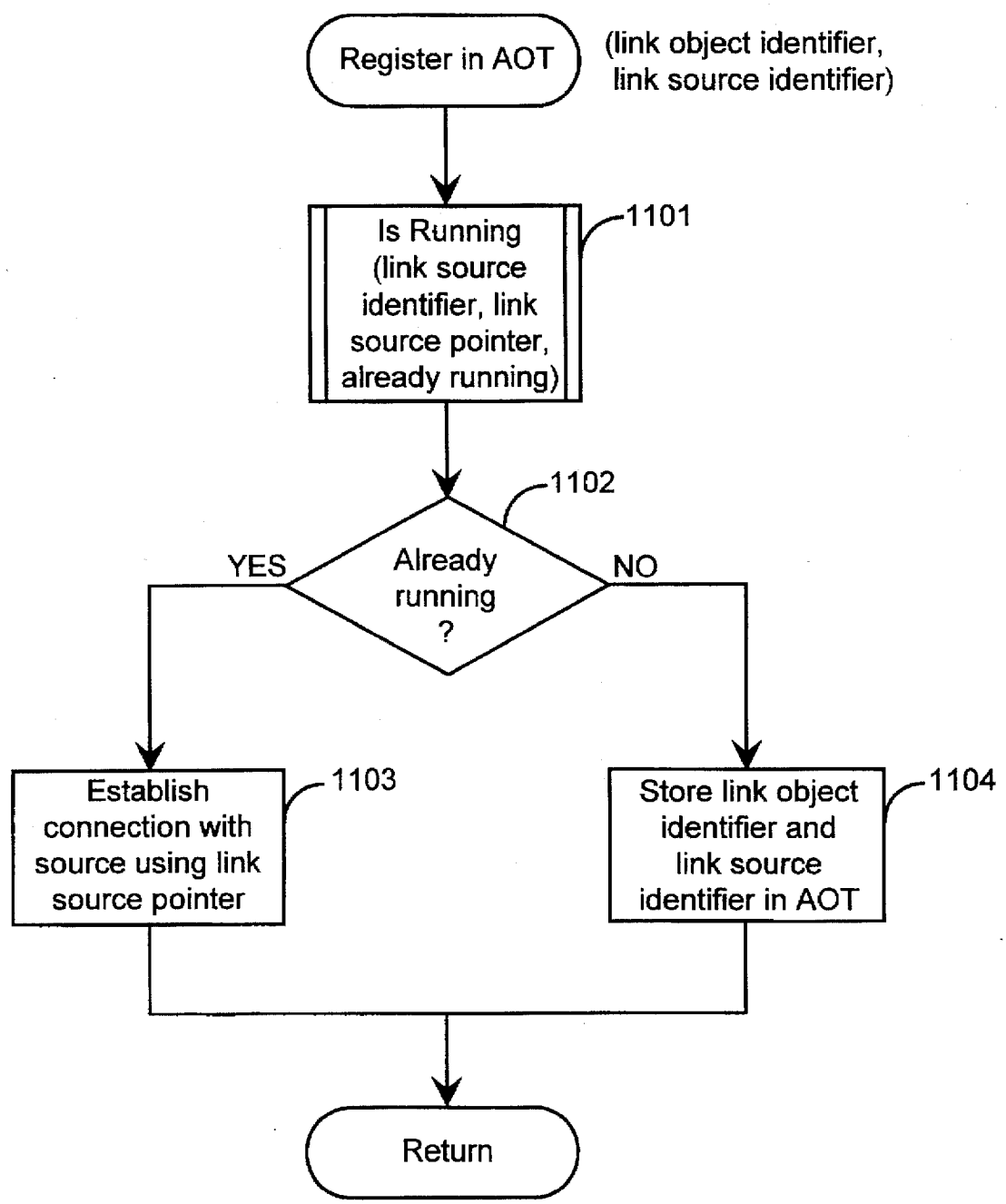
FIG. 11 is a flow diagram of the function RegisterInAOT.

FIG. 11 is a flow diagram of the function RegisterInAOT. The function RegisterInAOT is passed a link object identifier and its corresponding link source identifier and determines whether the link source is already running. If so, the function establishes a connection, else it adds an entry to the alert object table. In step 1101, the function invokes function IsRunning to determine whether the corresponding link source identifier is in the running object table. In step 1102, if the link source identifier is in running object table, then the function establishes a connection in step 1103, else in step 1104 the function adds an entry to the alert object table for the passed link object identifier. The function then returns.

Figure 12:
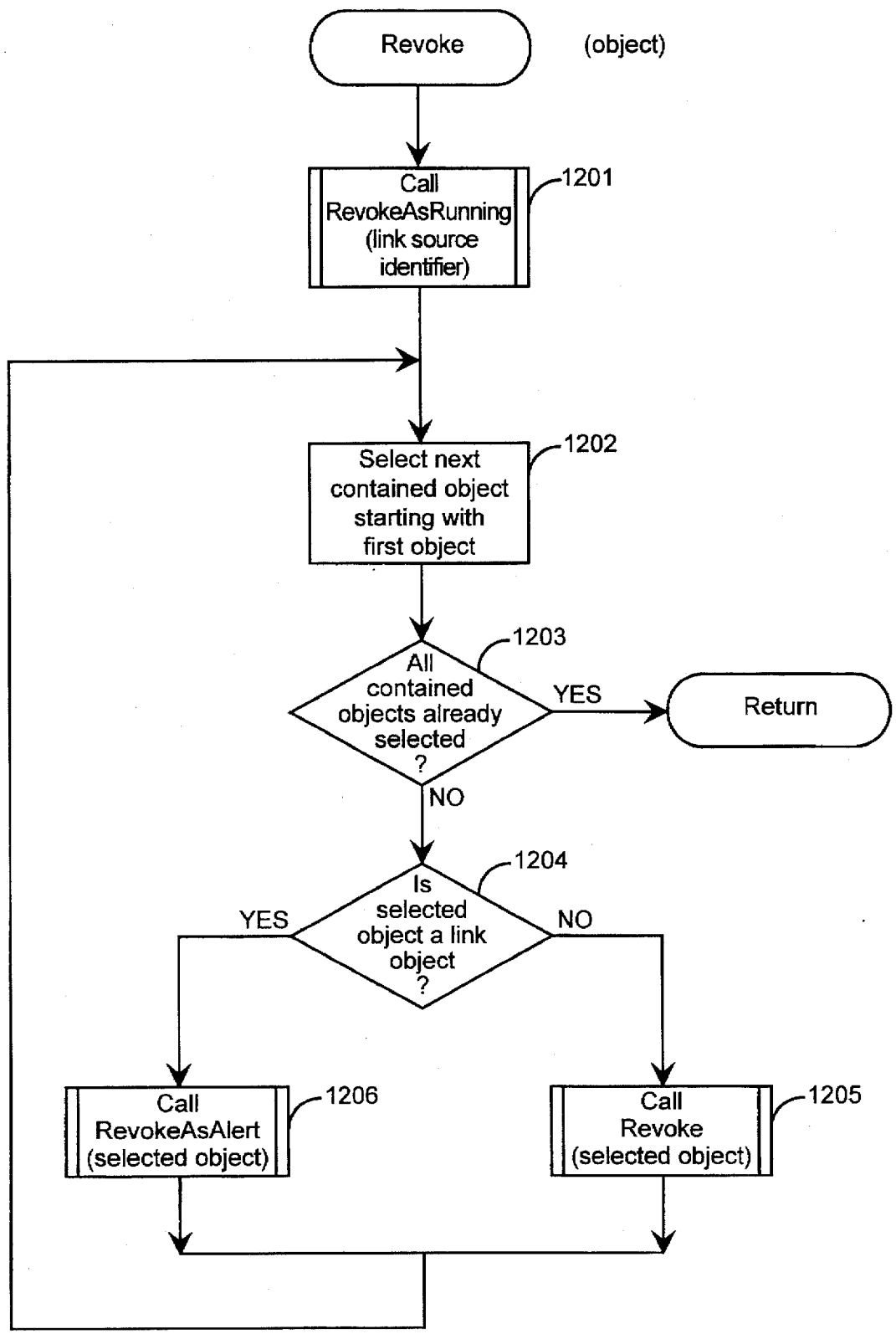
FIG. 12 is a flow diagram of the function Revoke.

FIG. 12 is a flow diagram of the function Revoke. The function Revoke inputs an object and removes the entry corresponding to the object and its contained objects from either the running or alert object table. In step 1201, the function invokes the function RevokeAsRunning passing it the link source identifier of the passed object. The function RevokeAsRunning removes the entry corresponding to the link source identifier from the running object table if it is in the table. In steps 1202 through 1206, the function loops revoking each contained object by calling the function RevokeAsAlert for link objects or by recursively calling the function Revoke for non-link objects. In step 1202, the function selects the next contained object, starting with the first contained object. In step 1203, if all contained objects have already been selected, then the function returns, else the function continues at step 1204. In step 1204, if the selected object is a link object, then the function continues at step 1206, else the function continues at step 1205. In step 1205, the function recursively invokes function Revoke passing it the selected object. The function then loops to step 1202. In step 1206, the function invokes the function RevokeAsAlert to remove the entry corresponding to the selected object from the alert object table. The function then loops to step 1202.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A method in a computer system for connecting a link object to a source object, the method comprising:

placing the source object in a running state, the running state indicating that the source object can be connected to the link object when the link object enters an alert state;

after placing the source object in the running state, placing the link object in an alert state, the alert state indicating that the link object can be connected to the source object when the source object is in the running state; and establishing a connection between the link object and the source object by sending an identifier of the link object to the source object.

2. A method in a computer system for automatically connecting a consumer to a source, the consumer having a link to the source, the method comprising:

registering the source when the source object enters a running state, the running state indicating that the source can be connected to a consumer with a link to the source;

when the link of the consumer enters the alert state, the alert state indicating that the consumer should be connected to the source when the source is in a running state, determining whether the source is registered; and connecting the consumer to the source upon a determination that the source is registered in by sending to the source a reference to the consumer so that the source can provide notifications to the consumer.

3. A method in a computer system for automatically connecting a link object to a source object, the method comprising:

registering the source object when the source object enters a running state, the running state indicating that the source object should be connected to the link object when the link object is in an alert state;

when the link object enters the alert state, the alert state indicating that the link object should be connected to the source object when the source object is in a running state, determining whether the source object is registered; and connecting the link object to the source object upon a determination that the source object is registered by sending to the source object a reference to the link object so that the source object can provide notifications to the link object.

4. A method in a computer system for automatically connecting a link to a source, the method comprising:

registering the link when the link enters an alert state, the alert state indicating that the link should be connected to the source when the source enters a running state;

when the source enters the running state, the running state indicating that the source should be connected to the link when the link object is in the alert state, determining whether the link object is registered; and connecting the link to the source upon a determination that the link is registered by sending to the source a reference to the link for the source to provide notifications to the link.

5. A method in a computer system for connecting a source to a consumer, the consumer having a link to the source, the method comprising:

placing the source in a running state and registering that the source is in the running state, the running state indicating that the source is available to be connected to a consumer with a link to the source;

placing the consumer in the running state; and after placing the consumer in the running state,
when the source in the running state as determined by whether the source is registered, sending to the source a reference to the consumer so that the source can provide notifications to the consumer.

6. A method in a computer system for connecting a source to a consumer, the consumer having a link to the source, the method comprising:

starting execution of the consumer which places the link in an alert state and registers that the link is in the alert state, the alert state indicating that the consumer is to be connected to the source when the source enters a running state;

placing the source in the running state; and after placing the source is in the running state,
when the link is in the alert state as determined by whether the link is registered, sending to the source a reference to the consumer so that the source can provide notifications to the consumer.

7. A computer-readable memory device containing instructions for controlling a computer system to connect a source object to a consumer, the consumer having a link to the source by:

placing the source in a running state and registering that the source is in the running state, the running state indicating that the source is available to be connected to a consumer with a link to the source;

placing the consumer in the running state; and after placing the consumer in the running state,
when the source in the running state as determined by whether the source is registered, sending to the source a reference to the consumer so that the source can provide notifications to the consumer.

8. A computer-readable memory device containing instructions for controlling a computer system to connect a source to a consumer, the consumer having a link to the source, by:

starting execution of the consumer which places the link in an alert state and registers that the link is in the alert state, the alert state indicating that the consumer is to be connected to the source when the source enters a running state;

placing the source in the ruining state; and after placing the source in the running state,
when the link is in the alert state as determined by whether the link is registered, sending to the source a reference to the consumer so that the source can provide notifications to the consumer.

* * * * *